US009020936B2

(12) United States Patent
Svore et al.

(10) Patent No.: US 9,020,936 B2
(45) Date of Patent: Apr. 28, 2015

(54) USING CATEGORICAL METADATA TO RANK SEARCH RESULTS

(75) Inventors: Krysta Marie Svore, Seattle, WA (US); Paul Nathan Bennett, Kirkland, WA (US); Susan T. Dumais, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 508 days.

(21) Appl. No.: 12/541,166

(22) Filed: Aug. 14, 2009

(65) Prior Publication Data
US 2011/0040752 A1     Feb. 17, 2011

(51) Int. Cl.
*G06F 17/30* (2006.01)

(52) U.S. Cl.
CPC .... *G06F 17/30864* (2013.01); *G06F 17/30696* (2013.01)

(58) Field of Classification Search
CPC ................................................. G06F 17/30864
USPC ........... 707/728, 999.004, 731, 723, 738, 748
See application file for complete search history.

(56) References Cited

U.S. PATENT DOCUMENTS

| | | | |
|---|---|---|---|
| 7,447,678 B2 | 11/2008 | Taylor et al. | |
| 2003/0172357 A1* | 9/2003 | Kao et al. | 715/529 |
| 2005/0055341 A1* | 3/2005 | Haahr et al. | 707/999.003 |
| 2007/0208730 A1 | 9/2007 | Agichtein et al. | |
| 2008/0059508 A1 | 3/2008 | Lu et al. | |
| 2008/0270376 A1 | 10/2008 | Svore et al. | |
| 2009/0083222 A1* | 3/2009 | Craswell et al. | 707/3 |
| 2009/0089286 A1 | 4/2009 | Kumar et al. | |
| 2009/0094223 A1* | 4/2009 | Berk et al. | 707/999.005 |
| 2009/0171894 A1 | 7/2009 | Schachter | |
| 2009/0327224 A1* | 12/2009 | White et al. | 707/3 |
| 2010/0082694 A1* | 4/2010 | Corsi et al. | 707/798 |
| 2010/0082752 A1* | 4/2010 | Donato et al. | 709/206 |
| 2010/0125572 A1* | 5/2010 | Poblete et al. | 707/722 |
| 2010/0293174 A1* | 11/2010 | Bennett et al. | 707/759 |
| 2010/0318532 A1* | 12/2010 | Sznajder et al. | 707/759 |
| 2011/0029517 A1* | 2/2011 | Ji et al. | 707/734 |

OTHER PUBLICATIONS

Wen-tau et al. "Finding advertising keywords on web pages", ACM, May 23-26, 2006, Edinburgh Scotland.*

(Continued)

*Primary Examiner* — Etienne Leroux
*Assistant Examiner* — Cindy Nguyen
(74) *Attorney, Agent, or Firm* — Dan Choi; Judy Yee; Micky Minhas

(57) ABSTRACT

A system that facilitates ranking search results returned by a search engine in response to receipt of a query is described herein. The system includes a receiver component that receives categorical metadata pertaining to an item and categorical metadata pertaining to the query and a computation component that computes at least one of a document feature pertaining to the item, a query feature pertaining to the query, or a document-query feature pertaining to the item and the query based at least in part upon one or more of the categorical metadata pertaining to the item or the categorical metadata pertaining to the query. The system also includes a ranker component that selectively places the item in a particular location in a sequence of items based at least in part upon the at least one of the document feature, the query feature, or the document-query feature.

20 Claims, 7 Drawing Sheets

(56) References Cited

OTHER PUBLICATIONS

Kules, et al., "Categorizing Web Search Results into Meaningful and Stable Categories Using Fast-Feature Techniques", retrieved at <<http://hcil.cs.umd.edu/trs/2006-15/2006-15.pdf>>, 2006 ACM, pp. 1-10.

Davies, et al., "QuizRDF: Search Technology for the Semantic Web", retrieved at <<http://ieeexplore.ieee.org/stamp/stamp.jsp?tp=&arnumber=1265293&isnumber=28293>>, Proceedings of the 37th Hawaii International Conference on System Sciences—2004, pp. 1-8.

Papadakis, et al., "Interactive Search Results", retrieved at <<http://thalis.cs.unipi.gr/~jpap/interactive.pdf>>, pp. 1-15, Year: 2002.

Hearst, Marti A., "Next GenerationWeb Search: Setting Our Sites", retrieved at <<http://www.cs.aue.auc.dk/~legind/F8S_IR_kursus/IRsupplerende/Links%20and%20hyperstructure/A00SEP-CD.pdf#p.=40>>, Bulletin of the IEEE Computer Society Technical Committee on Data Engineering, 2000, pp. 38-48.

\* cited by examiner

USING CATEGORICAL METADATA TO RANK SEARCH RESULTS

BACKGROUND

An amount of information available by way of the World Wide Web has grown exponentially, such that billions of items are available by way of the World Wide Web. This explosive growth of information available on the Web has not only created a crucial challenge for search engine companies in connection with handling large scale data, but has also increased the difficulty for a user to manage his or her information needs. For instance, it may be difficult for a user to compose a succinct and precise query to represent his or her information needs.

Instead of pushing the burden of generating succinct, precise search queries to the user, search engines have been configured to provide increasingly relevant search results to user queries. More particularly, a search engine can be configured to retrieve documents relevant to a user query by comparing attributes of documents together with other features such as anchor text, and can return documents that best match the query. Conventional search engines can also consider previous user searches, user location, and current events, amongst other information in connection with providing the most relevant search results to a query issued by a user. The user is typically shown a ranked list of universal resource locators (URLs) in response to providing a query to the search engine.

Properly ranking search results is an important task, as a typical user is not willing to sift through several pages of search results, but instead only reviews a most prominently presented relatively small number of search results on a search results page, before entering a different query or abandoning the search entirely. Thus, often a searcher will assume that a small subset of search items shown on a first search results page is most relevant to the user and/or the query, when in actuality the user may have found a search item on a subsequent page that is most relevant to the user and query. Ranking of search results is performed by ranking algorithms (rankers). Information retrieval metric methods are used to determine the quality of a ranking generated by a ranker, as well as a cost of a ranking generated by a ranker (e.g., a higher measure of quality corresponds to a lower measure of cost).

SUMMARY

The following is a brief summary of subject matter that is described in greater detail herein. This summary is not intended to be limiting as to the scope of the claims.

Described herein are various technologies pertaining to ranking search results responsive to receipt of a query. In particular, various technologies pertaining to ranking search results based at least in part upon categorical metadata pertaining to an item or items and/or categorical metadata pertaining to a query are described herein. In an example, at least a subset of items (documents, images, videos) retrievable through utilization of a search engine can have categorical metadata assigned thereto. For instance, an item may have a category assigned thereto, a confidence score pertaining to a category assigned thereto, a value indicating whether or not a certain category assigned to the item falls within a bin, a distribution of categories assigned to the item, etc. For purposes of explanation but not limitation, example categories may be news, sports, weather, geography-based categories, etc.

Categorical metadata pertaining to the query can be derived based at least in part upon one or more categories assigned to items that are mapped to the query, wherein the mapping between items and a query can be undertaken in a variety of manners. In an example, categorical metadata of the query can be a distribution of categories across a set of documents in a filter set, wherein the filter set is a threshold number of items initially retrieved by a search engine responsive to receipt of the query. The distribution of categories across such filter set can be assigned to the query and can be the categorical metadata pertaining to the query. In another example, if the query has been issued to the search engine at a previous point in time, a click graph pertaining to the query can be analyzed, wherein a first set of nodes in the click graph represents queries and a second set of nodes represents URLs or items selected (clicked on) by users. An edge in the click graph between a node in the first set of nodes and a node in the second set of nodes indicates that a a query represented by the node in the first set of nodes has been issued, and an item has been selected upon the query being issued, where the item is represented by the node in the second set of nodes connected to the node in the first set of nodes by an edge. As indicated above, the items may have categorical metadata assigned thereto, and for a given query the distribution of categories (or certain categorical metadata pertaining to items) over items selected can be ascertained and can be assigned to the query as categorical metadata pertaining to the query.

Once the categorical metadata pertaining to items retrieved by a search engine responsive to receipt of a query and categorical metadata pertaining to the query are determined, one or more features can be generated based at least in part upon such categorical metadata, wherein the features may be document features, query features, and/or document-query features. Document features can be features that are dependent solely upon the categorical metadata pertaining to the items, query features can be features that are based solely upon the categorical metadata pertaining to the query, and document-query features can be features that are dependent upon both the categorical metadata pertaining to the items and the categorical metadata pertaining to the query. Example document features can include, but are not limited to, a score assigned to a particular category (e.g., for a single item or a plurality of items), a probability that any item in the items retrieved by the search engine is assigned a particular category, an entropy of a categorical distribution pertaining to one or more items, amongst other document features. Again for purposes of explanation, query features can be, but are not limited to, a value that indicates whether the query pertains to a particular category (e.g., the query feature has a value of 1 for a category if it is associated with such category), an entropy of category distribution pertaining to the query, which can be obtained by ascertaining the entropy of the category distribution obtained from averaging with equal/unequal weight the first m items over some set of items associated with the query, amongst other query features. Document-query features can be, but are not limited to, a value that indicates whether a category assigned to an item corresponds to a category assigned to the query (e.g., a value of 1 if a top level query category matches a top level document category), amongst other document-query features.

Such features can be provided to a ranker that can rank search items based at least in part upon at least one of a document feature, a query feature, or a document-query feature. The ranker can be trained using such features in accordance with any suitable information retrieval metric method. Search results can retrieved by the search engine and ranked by the ranker based at least in part upon the at least one of the document feature, the query feature, or the document-query feature, and can be presented to a user on a display screen of a computing device or output to another computing process.

These and other aspects will be appreciated upon reading and understanding the attached figures and description.

DETAILED DESCRIPTION

Figure 1:
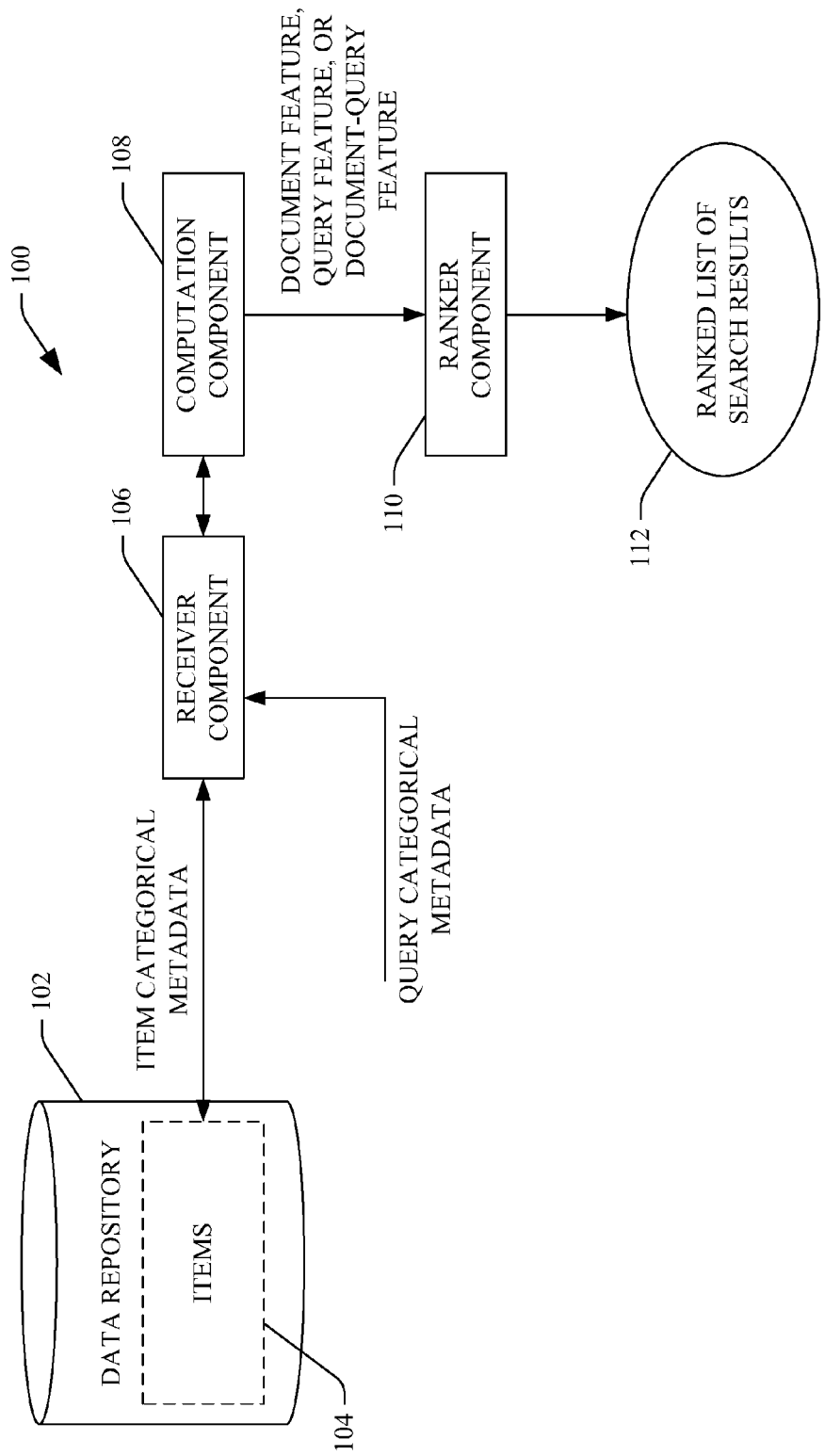
FIG. 1 is a functional block diagram of an example system that facilitates ranking search results based at least in part upon categorical metadata pertaining to an item and/or a query.

Various technologies pertaining to ranking search results will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates ranking items based at least in part upon categorical metadata is illustrated. As described herein, the system 100 is used in connection with a search engine that outputs search results responsive to receipt of a query. Thus, the search engine may be a web-based search engine, a desktop search application, an application that facilitates performing an enterprise search, an application that facilitates searching one or more digital libraries, or other suitable search application/module. It is to be understood, however, that the system 100 may be configured in connection with selecting one or more advertisements displayed to a user on a display screen of a computing device.

The system 100 includes a data repository 102 that comprises a plurality of items, wherein each of the items has categorical metadata assigned thereto. It is to be understood that the data repository 102 may also include items that are not assigned categorical metadata. As used herein, an item may be a uniform resource locator, a document, an image, a video, or other suitable item. For example, that categorical metadata may be based at least in part upon the Open Directories Project (ODP) categorization scheme, based upon user-defined categories, or other suitable categorization scheme.

In an example, the categorical metadata may be or include a category that is assigned to an item. An example category assigned to an item may be golf (if the item relates to golf). Additionally, categories that can be assigned to items may be hierarchical in nature or have some other suitable structure corresponding thereto. In an example, an item that is an image of the Washington Monument may be assigned a top-level category of United States and a lower-level category of Washington, D.C. Still further, categories assigned to items may be non-topical in nature. For example, items may relate to books that are to be read by school-aged children, and categories assigned to such books may be second-grade reading level, fifth grade reading level, etc. Accordingly it is to be understood that items in the data repository 102 may be assigned any suitable category or categories.

In other examples, the categorical metadata pertaining to items may be or include an indication that an item is assigned a single category or multiple categories; a distribution across several categories assigned to an item or group of items, where the values across all categories for a given item may sum to a certain number (e.g., one); a distribution across several categories assigned to an item or group of items where values across all categories for a given item need not sum to a certain value, but each category value is between two numbers (e.g., zero and one), which can be a probability or confidence value pertaining to a category with respect to the item or group of items. In yet another example, a category assigned to a value can be binned such that it is known which bin a category falls in, but a value pertaining to the bin is unknown. These and other categorization techniques are contemplated, and any suitable categorization technique can be utilized in connection with assigning/determining categorical metadata pertaining to an item or group of items.

The system 100 additionally includes a receiver component 106 that can receive data from the data repository 102. For instance, the receiver component 106 can receive first categorical metadata pertaining to an item retained in the data repository 102. Additionally, the receiver component 106 can receive categorical metadata pertaining to a query that can be explicitly issued by a user or formulated (e.g., based upon a profile) to represent informational needs of the user. Example categorical metadata pertaining to items in the data repository 102 have been provided above. The categorical metadata pertaining to a query may be or include categorical metadata that can be derived based at least in part upon some mapping between a query and an item or set of items, wherein categorical metadata pertaining to the query can be derived from categorical metadata pertaining to items that are in some way related to the query. Example manners for mapping a query to items and for ascertaining categorical metadata pertaining to the query will be described in greater detail below.

The system 100 also comprises a computation component 108 that is in communication with the receiver component 106. The computation component 108 can compute at least one of a document feature pertaining to the at least one item, a query feature pertaining to the query, or a document-query feature that pertains to the item and the query. As used herein, a document feature can be a feature that is derived solely from categorical metadata pertaining to items, a query feature can be derived solely from categorical metadata pertaining to the query, and a document-query feature may be derived from both the categorical metadata pertaining to the items and the categorical metadata pertaining to the query.

Example document features that can be computed by the computation component 108 with respect to an item or a set of items may be or include a score assigned to one or more categories pertaining to an item; a probability that an item in a set of item has a particular category; an identity of a category with a highest score, second highest score, third highest score, etc.; a probability that an item was assigned a highest scoring category, a second highest scoring category, a third highest scoring category, etc.; a posterior entropy of an item or set of items, which can be defined as Sum(P(category|item)log P(category|item)), where 0 log 0=0; a top-level item posterior entropy which can be substantially similar to the posterior entropy of the item, but for a top-level category if categories assigned to an item are hierarchical; a low-level document posterior entropy, which can be substantially similar to the posterior entropy of the item, but for a low-level category if categories assigned to an item are hierarchical; a change in odds of an item or items, which can be defined as log[P(category|document)(1−P(category|empty))]/[(1−P(category|document))P(category|empty)]; a change in odds pertaining to an item for a maximum category, which is substantially similar to the change in odds of the item or set of items but for a most likely posterior category, a change in odds of the item of set of items and/or the change in odds of the item or set of items based upon a level of hierarchical categories; and/or a feature for each category. With respect to the feature for each category, for instance, the feature can be zero if the item does not have a particular feature assigned thereto or one if the item has a particular feature assigned thereto. In another example, the feature for each category may be a binned value corresponding to the category, a confidence value corresponding to the category, or some other original value assigned to a category (for each category).

Query features computed by the computation component 108 can be or include a feature for each category, where the feature value for each category can be zero or one depending upon whether or not the category corresponds to the query. In another example, the feature value for each category can be a binned value pertaining to the category with respect to the query, a confidence value pertaining to the category with respect to the query, or some other value assigned to a category. Additionally, query features computed by the computation component 108 can include a query entropy for a first m categories, which can be the entropy category distribution obtained by ascertaining the entropy of the category distribution ascertained from averaging with equal/unequal weight the first m categories (e.g., the first m categories with a highest score). The query features can also include a query entropy for a first m categories with respect to a top n number of items believed to be most relevant to the query, which can be the entropy category distribution obtained by ascertaining the entropy of the category distribution determined from averaging with equal/unequal weight the first m categories for the top n items. Further, the query features can include a query entropy for a first m categories for a top n number of results where thresholding is used as in search, the query features can include a query entropy for a first m categories for a top n number of items but where the items are given a weight based on ranking of the items in a result set, and/or query entropy average for a top n number of search results, which is similar to what has been described above except that posterior probabilities are averaged instead of predictions being averaged.

Document-query features which can be computed by the computation component 108 can be or include a document-query top-level match feature, which may be a binary feature with a value of 1 if a top-level category assigned to an item matches a top-level category assigned to a query. The feature can also indicate whether a confidence value pertaining to a category assigned to the document and the query is within a threshold and/or indicate whether a bin value pertaining to the category assigned to the document and the category assigned to the query is within a threshold. Another document-query feature may be a document to query low-level match feature, which may be a binary feature with a value of 1 if a low-level category assigned to an item is also a low-level category assigned to the query. Again, such feature value can also pertain to a confidence value or bin value pertaining to a category assigned to both an item and a query, and can have a low-level match feature for each level of a categorization hierarchy. Yet another document-query feature can be a document change in odds with respect to a most prevalent category in a results set pertaining to the query, wherein prevalent can refer to a number of items assigned to items pertaining to the query, summed confidence scores pertaining to categories assigned to items and/or the query, etc. Additionally or alternatively, a document-query feature computed by the computation component 108 can be a document probability top-n category, which can be the same as the document change in odds referred to above but for the posterior only.

A ranker component 110 can receive at least one document feature, query feature, or document-query feature, and can selectively place at least one item in a particular location in a ranked list of items based at least in part upon the document feature, the query feature, and/or the document-query features. Thus, the ranker component 110 can output a ranked list of search results 112 based at least in part upon document features, the query features, and/or the document-query features that are derived from categorical metadata pertaining to items and/or queries.

Figure 2:
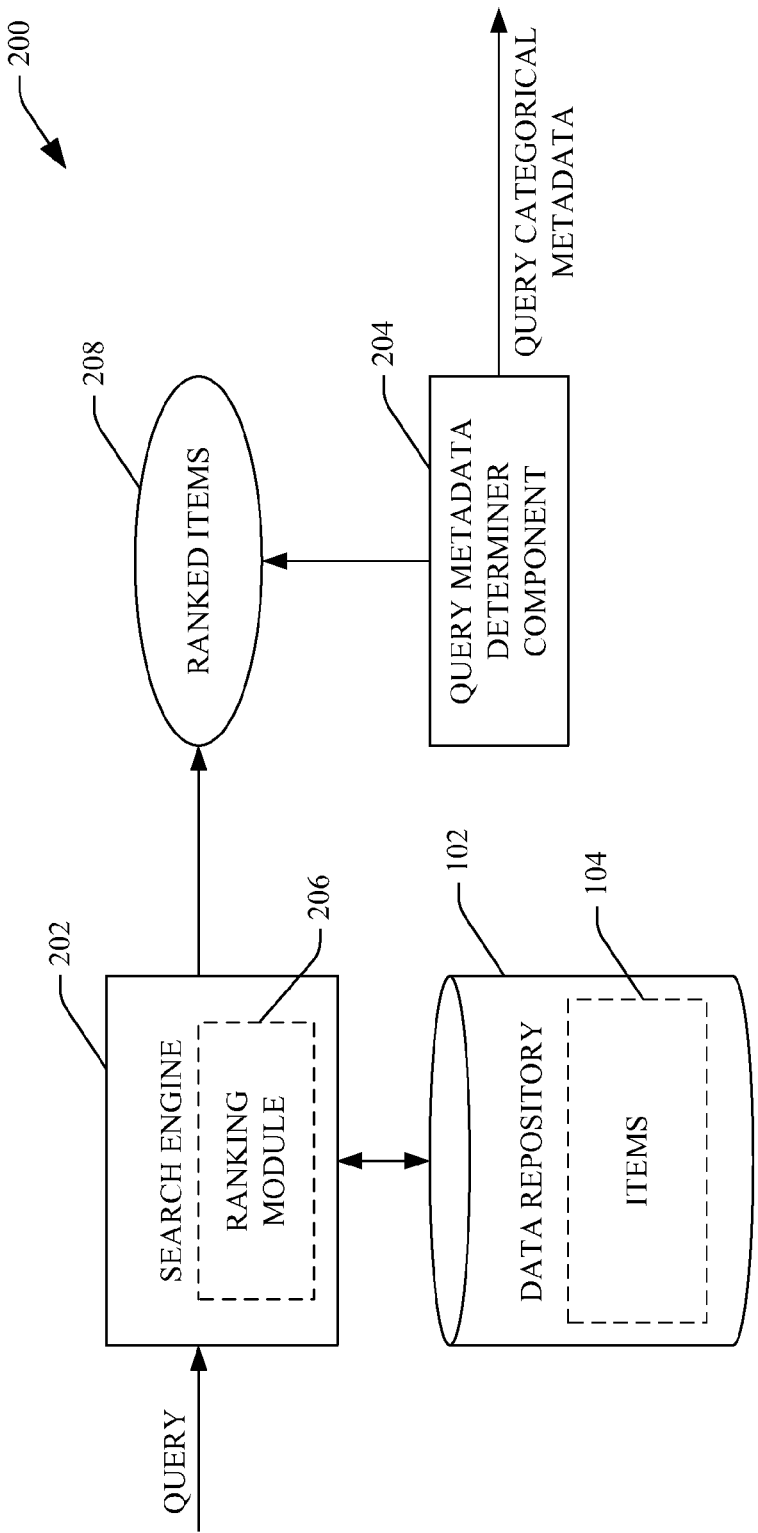
FIG. 2 is a functional block diagram of an example system that facilitates determining categorical metadata pertaining to a query.

With reference now to FIG. 2, an example system 200 that facilitates assigning categorical metadata to a query is illustrated. The system 200 includes the data repository 102 that comprises the items 104 that have categorical metadata assigned thereto. The system 200 also includes a search engine 202 that can receive a query. The search engine 202 can execute a search over the items 104 stored in a data repository 102 based at least in part upon the query. For instance, the data repository 102 may comprise a plurality of URLs that point to certain items available by way of the World Wide Web, and the URLs can have categorical metadata assigned thereto. Moreover, the data repository 102 may be a distributed data repository that is spread over multiple servers, for example.

The search engine 202 may use any suitable search technology in connection with retrieving a subset of items from the data repository 102. In an example, a subset of the items retrieved by the search engine 202 can be used as a filter set in connection with assigning categorical metadata to the query. For instance, a query metadata determiner component 204 can analyze categories that have been assigned to the subset of items retrieved by the search engine 202, and can ascertain a distribution of such categories. The category distribution may then be assigned to the query as categorical metadata pertaining to the query. Thus a filter set can be used in connection with assigning categorical metadata to the query.

In another example, the search engine 202 may include a ranking module 206. The search engine 202 can retrieve a subset of items from the data repository 102 based at least in part upon the query; and the ranking module 206 can rank such subset of items. The search engine 202 may then output the ranked items 208 (e.g., cause the ranked items to be stored in a particular data storage location). The query metadata determiner component 204 can consider a top threshold number of items retrieved by the search engine 202 and ranked by the ranking module 206. For instance, the query metadata determiner component 204 can consider a top one hundred items retrieved by the search engine 202 and ranked by the ranking module 206. The query metadata determiner component 204 may thereafter analyze categories assigned respectively to the subset of the top one hundred items and may determine a distribution of such items. This distribution may then be assigned to the query as categorical metadata pertaining to the query.

Figure 3:
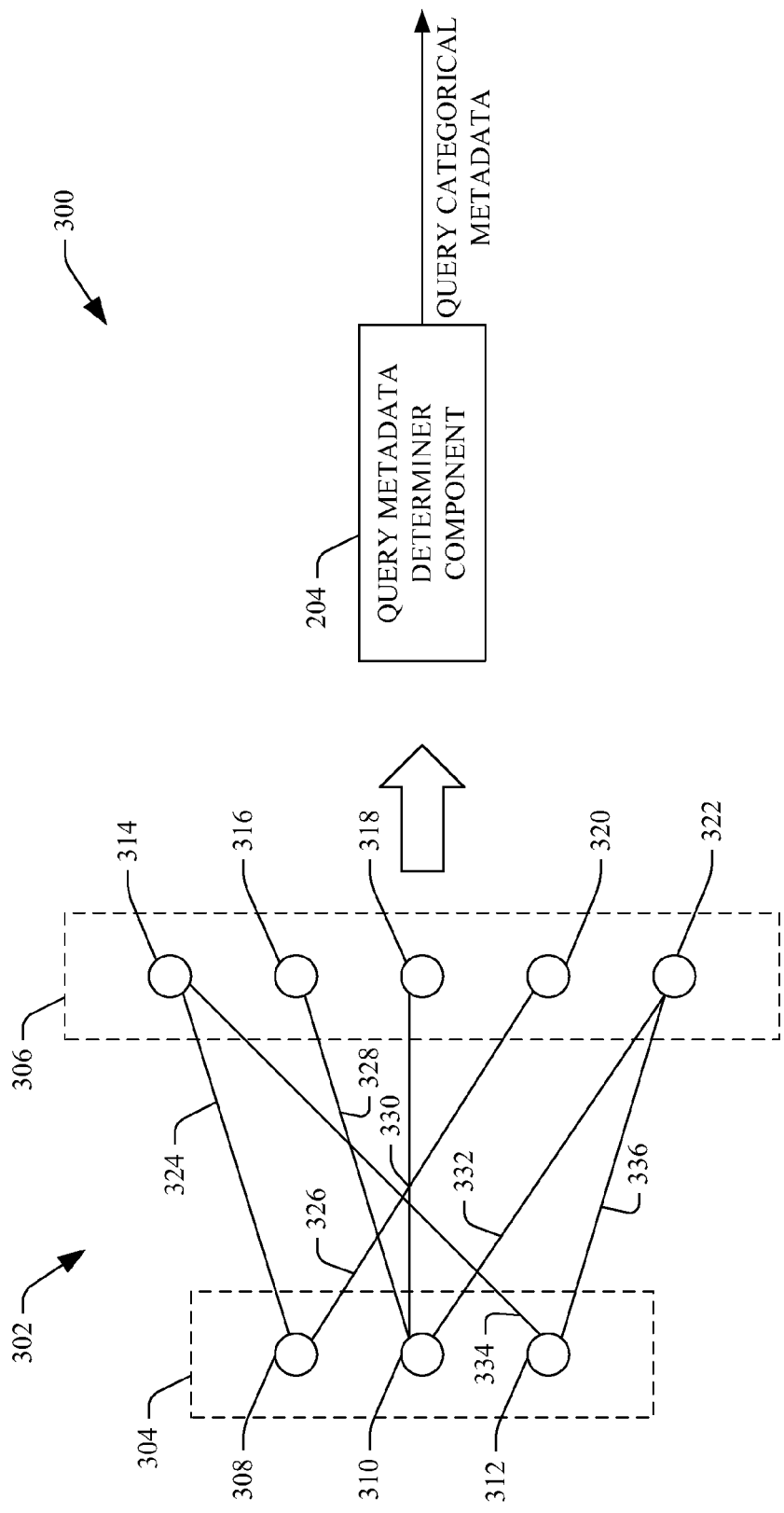
FIG. 3 is a functional block diagram of an example system that facilitates determining categorical metadata pertaining to a query.

Referring now to FIG. 3, an example system 300 that facilitates assigning categorical metadata to a query is illustrated. The system 300 includes the query metadata determiner component 204 that determines categorical metadata pertaining to a query based at least in part upon a click graph 302 that includes a node representative of the query. While not shown, it is to be understood that the click graph 302 can be retained in a data repository. The click graph 302 includes a first set of nodes 304 that are representative of queries issued to a search engine. The click graph 302 also includes a second set of nodes 306 that are representative of items (URLs) selected by users upon the queries represented in the first set of nodes 304 being issued. In particular, the first set of nodes 304 includes a first node 308 that represents a first query, a second node 310 that represents a second query, and a third node 312 that represents a third query. The second set of nodes 306 includes a fourth node 314 that represents a first item, a fifth node 316 that represents a second item, a sixth node 318 that represents a third node, a seventh node 320 that represents a fourth item, and an eighth node 322 that represents a fifth item. The click graph 302 also includes edges 324-336 that indicate that at least one individual has selected an item represented by a node in the first set of nodes 306 upon issuing a query represented by a node in the first set of nodes 304. Thus, in an example, at least one user selected an item represented by the fourth node 314 upon the query represented by the first node 308 being issued to a search engine. Additionally, edges in the click graph 302 can be weighted to indicate a number of times that individuals selected certain items when particular queries were issued.

As indicated above, the query metadata determiner component 204 can determine categorical metadata pertaining to a query by analyzing the click graph 302. Thus, the query metadata determiner component 204 can analyze the click graph 302 with respect to a particular query, review edges that couple the node that represents the query, and calculate a distribution over categories over the items clicked by users with respect to the query. The query metadata determiner component 204 may then assign such category distribution to the query as categorical metadata pertaining to the query.

In another example, the query metadata determiner component 204 can broaden the assignment of categories or category distribution to the query through utilization of the click graph 302. For instance, a random walk can be undertaken with respect to the click graph 302 such that the query metadata determiner component 204 can consider not only categories assigned to an item clicked on for a particular query, but also other queries for which a document was clicked on, and documents clicked for those other queries as well. In an example, the query metadata determiner component 204 may desirably generate categorical metadata for a query represented by the node 308. In a random walk model, the query metadata determiner component 204 can ascertain that the edge 324 couples the node 308 with the node 314 (which represents an item clicked on by at least one user when the query was issued). The query metadata determiner component 204 may then follow the edge 334 to the node 312 that represents another query. The query metadata determiner component 204 may assign categorical metadata to the query represented by the node 308 that has been previously assigned to the query represented by the node 312. Additionally or alternatively, the random walk can continue over the edge 336 to the node 320 that represents another item, represented by the node 322. Categories assigned to such item (represented by the node 322) may then also be assigned to the query represented by the node 308. Again, the categorical metadata may be a distribution of categories assigned to items considered in the random walk.

Moreover, edges in the click graph 302 can be weighted, and the query metadata determiner component 204 can consider weights of edges when assigning categorical metadata to a particular query. For example, the edges can be weighted to indicate a number of instances that a query has been issued and that a certain item was selected upon issuance of the query. Thus, a greater weight of an edge indicates that more individuals selected an item when issuing a particular query. Such weights can be considered when determining a distribution of categories pertaining to the query.

While several examples have been described herein for determining categorical metadata pertaining to a query, it is to be understood that other mechanisms may also be employed in connection with determining categorical metadata pertaining to queries. Additionally, mechanisms for determining categorical metadata pertaining to a query can be combined. For instance, a first category distribution can be assigned, based at least in part upon a filter set (as described with respect to FIG. 2) and a second category distribution can be ascertained through analysis of a click graph (as described with respect to FIG. 3). Such category distributions can be combined and assigned to the query as categorical metadata for such query. In another example, the distributions may be assigned separately to a query as categorical metadata that pertains to the query. Moreover, other mechanisms can be utilized (besides a filter set or click graph) for defining a set of items that will be considered for a certain query. It is to be understood that for any given mapping of queries to items, a model can be learned across such documents such that for each term or phrase (query), a distribution of categories can be learned across such term or phrase. This can then be employed to map query terms to a categorization directly, without retrieving relevant documents. Additionally, while the above has described assignment of a category distribution to a query, it is to be understood that a distribution of probability scores of categories assigned to items pertaining to a query can be assigned to the query as categorical metadata, or some other approach may be employed.

Furthermore, for the above-described assignment of categorical metadata to queries, each item and category distribution of the item need not be weighted in a substantially similar manner. For instance, alternative categorizations of documents can be considered such that when calculating a category distribution for a query, a weighted combination of documents' category distributions can be considered. For instance, a uniform weighting of item categorizations can be considered, a weighting based on ranked position of items can be considered, a weighting based on a number of clicks of a URL given a certain query can be considered, etc.

Still further, the generation of queries' categorical metadata by the query metadata determiner component 204 is not limited to a single type of category distribution for items. For instance, an item could be assigned a single category; a distribution across several categories where the values across all categories for a given item may sum to a certain number, a distribution across several categories where values across all categories for a given item need not sum to a certain number, but each category value is between two numbers (e.g., 0 and 1) which can be a probability or confidence value pertaining to a category, etc. This categorical metadata pertaining to items can be utilized to derive categorical metadata pertaining to a query.

Additionally, categorical metadata pertaining to a query may be assigned prior to a search being undertaken or at execution of a search. For instance, if the query is a popular query and has been issued previously, a category distribution can be assigned to such query based at least in part upon a mapping between the query and a subset of items. In another example, the categorical metadata pertaining to the query can be ascertained during execution of a search. Thus, upon receiving a query, the search engine can ascertain some mapping between the query and one or more items, and may assign a categorical distribution (categorical metadata) to the query, based at least in part upon such mapping.

Figure 4:
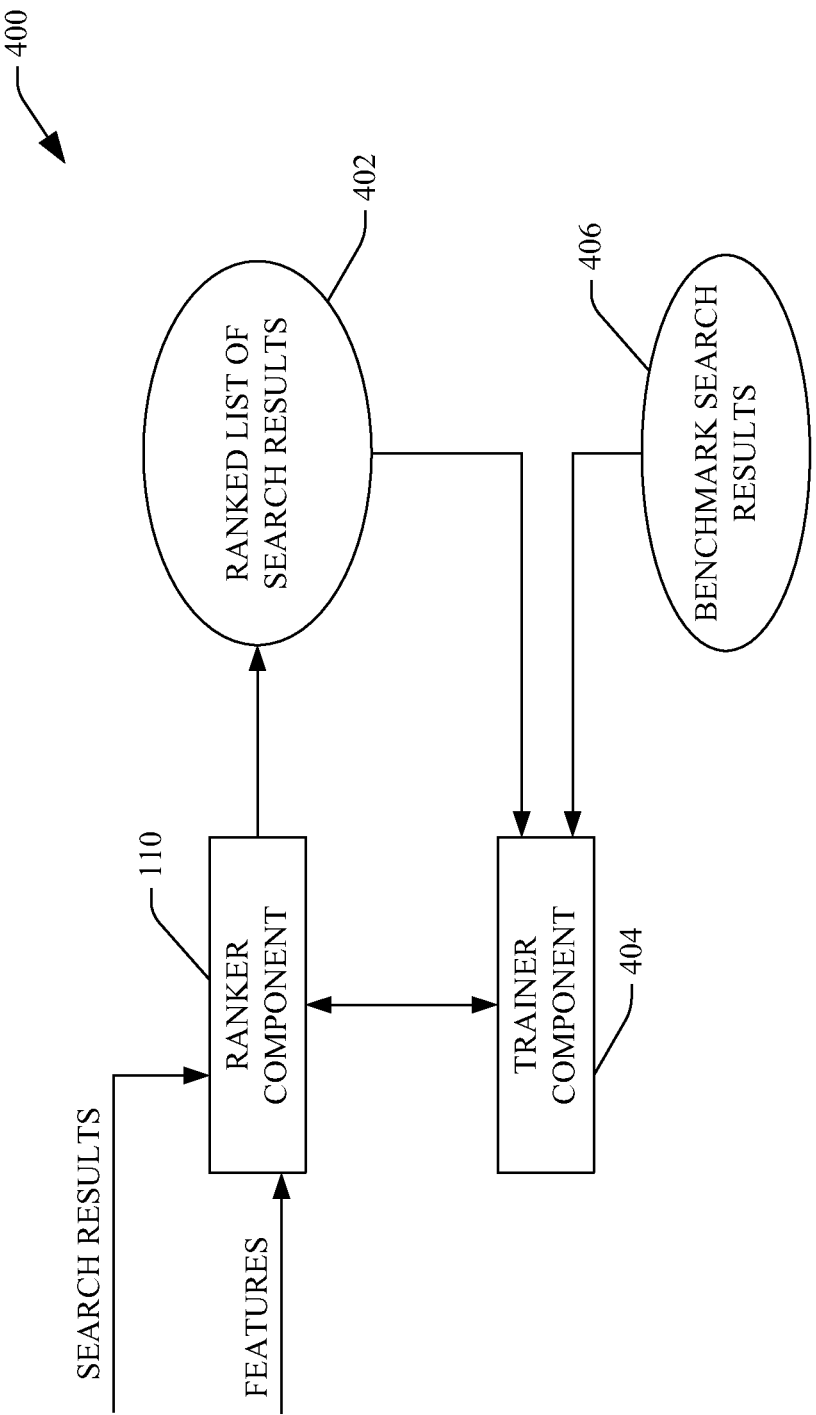
FIG. 4 is a functional block diagram of an example system that facilitates training a ranker in connection with ranking search results based at least in part upon categorical metadata pertaining to at least one item and/or at least one query.

Turning now to FIG. 4, an example system 400 that facilitates training the ranker component 110 is illustrated. The ranker component 110 receives search results for a particular query and features that are derived from document features, query features, or document-query features. The features can include any suitable combination of the features described above that are generated by the computation component 108 (FIG. 1). The ranker component 110 outputs a ranked list of search results 402 that are based at least in part upon the document features, the query features, and/or the document-query features.

The system 400 further includes a trainer component 404 that receives the ranked list of search results 402. The trainer component 404 may also receive benchmark search results 406 (e.g., labeled document-query pairs and/or features that indicate a desired ranking of search results for a particular query). The trainer component 404 may then update parameters of the ranker component 110 based at least in part upon the benchmark search results 406 and the ranked list of search results 402. For instance, the trainer component 404 can utilize any suitable information retrieval quality metric/method in connection with training the ranker component 110. Once the ranker component 110 has been trained, the ranker component 110 can be utilized in a search engine in connection with ranking search results pertaining to a query.

Figure 5:
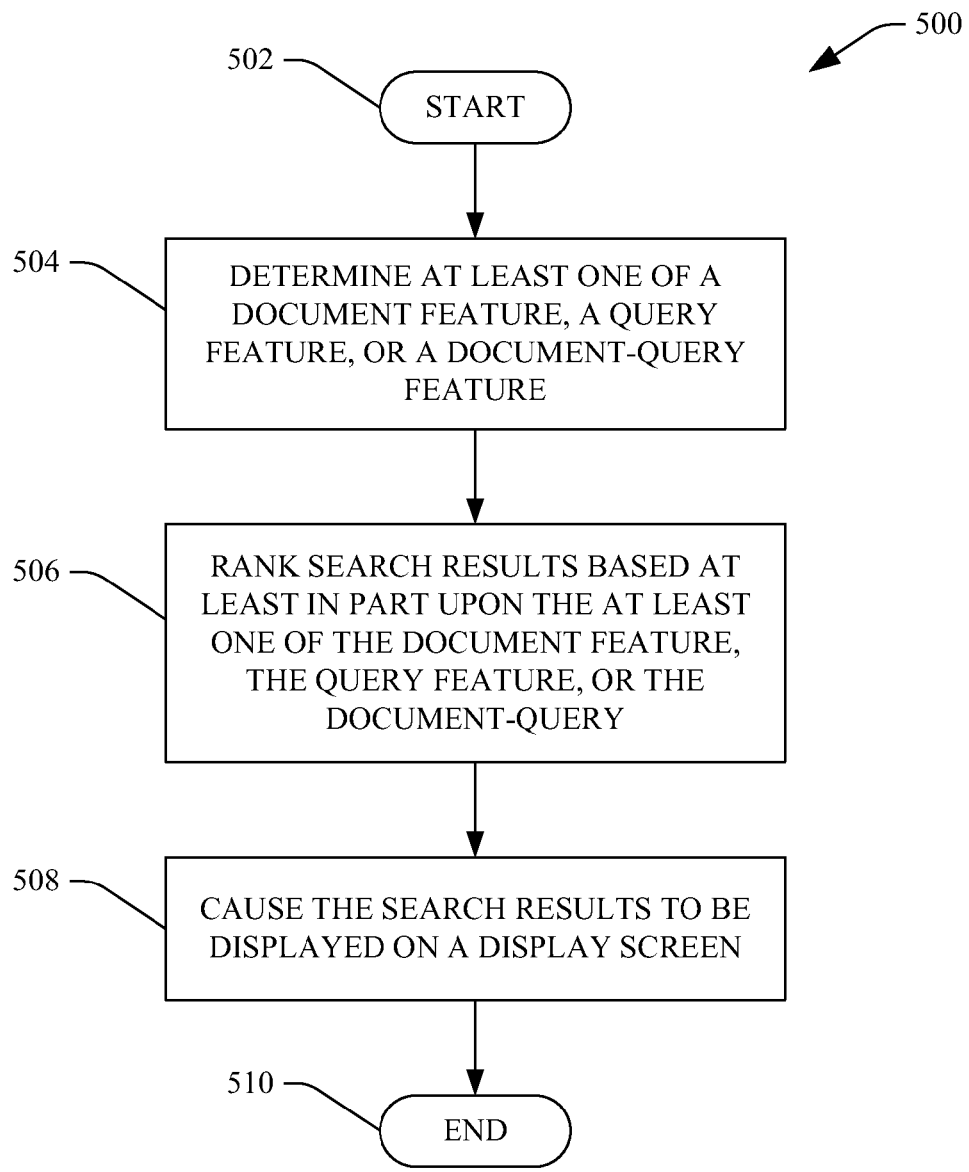
FIG. 5 is a flow diagram that illustrates an example methodology for ranking search results based at least in part upon categorical metadata pertaining to at least one item and/or at least one query.
Figure 6:
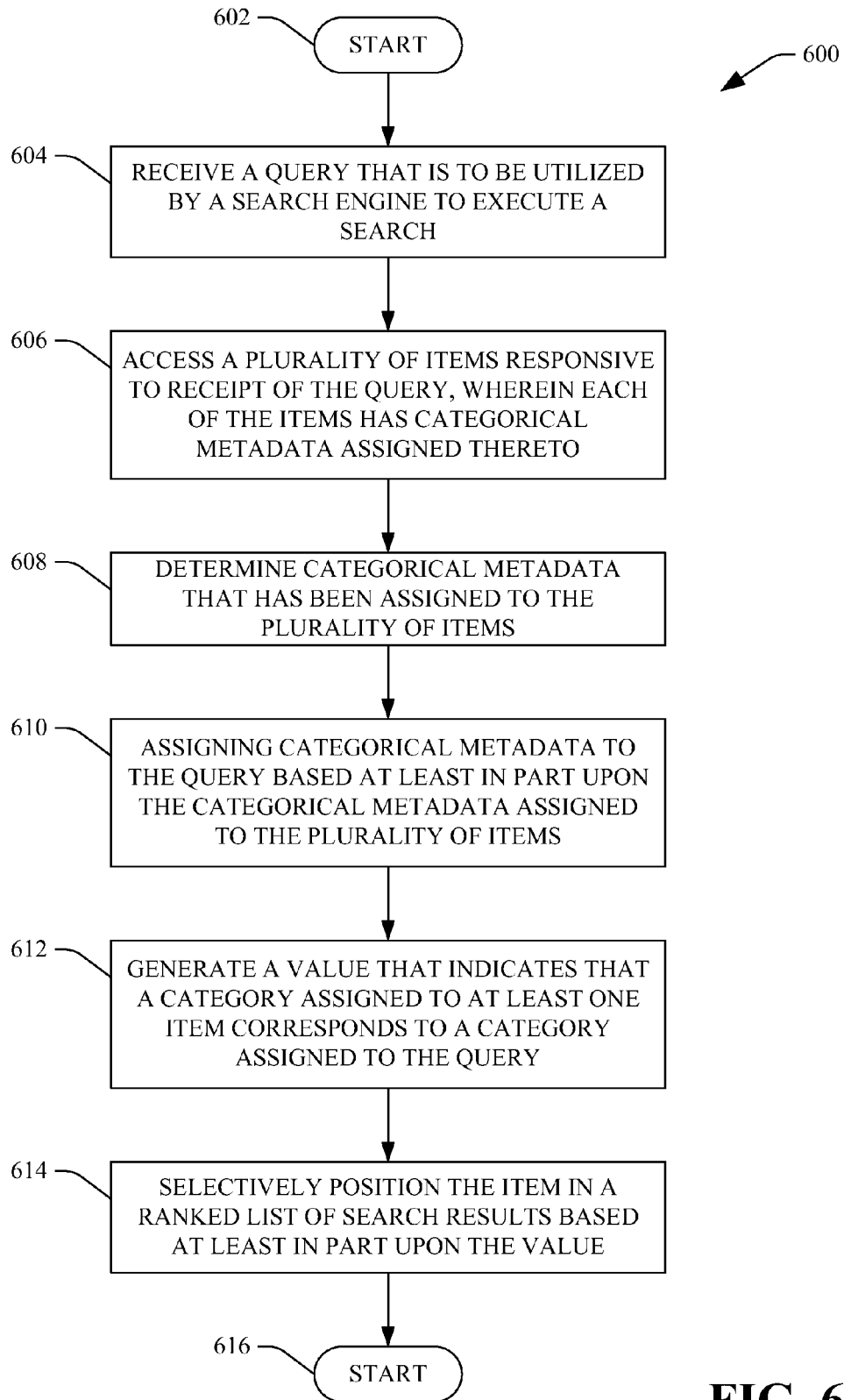
FIG. 6 is a flow diagram that illustrates an example methodology for ranking search results based at least in part upon features derived from categorical metadata.

With reference now to FIGS. 5 and 6, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Now referring to FIG. 5, a methodology 500 that facilitates ranking search results based at least in part upon categorical metadata pertaining to an item or a query is illustrated. The methodology 500 begins at 502, and at 504 at least one of a document feature, a query feature, or a document-query feature is determined, wherein such features can be determined based at least in part upon categorical metadata corresponding to at least one of an item accessible by way of a search engine or a query executable by the search engine to retrieve items. As indicated above, categorical metadata may be or include a category assigned to an item, a confidence value pertaining to a category assigned to an item, a bin to which a category is assigned, a value assigned to a category that is assigned to an item, or other suitable metadata. Furthermore, categorical metadata pertaining to the query may be or include a distribution of categories pertaining to items mapped to the query, or other suitable metadata. Additionally, the search engine may be a web-based search engine, a desktop search application, an application that facilitates performing an enterprise search, an application configured for searching over a digital library, or some other suitable tool that can be utilized in connection with retrieving items through utilization of one or more query terms.

At 506, search results are ranked based at least in part upon at least one of the document feature, the query feature, or the document-query feature determined at 504.

At 508, the ranked search results are caused to be displayed upon a display screen, wherein the search results are ordered on the display screen according to the ranking of the search results. For example, an item believed to be most relevant to the user and/or the query can be displayed at the top of a ranked list of search results, and items underneath can be ranked according to their perceived relevance to the document and/or the user. The methodology 500 completes at 510.

With reference now to FIG. 6, an example methodology 600 that facilitates ranking search results upon receipt of a query based at least in part upon categorical metadata pertaining to an item and/or the query is illustrated. The methodology 600 starts at 602, and at 604 a query that is to be utilized by a search engine to execute a search is received. At 606, a plurality of items are accessed responsive to receipt of the query, wherein a subset of the items has categorical metadata assigned thereto. In an example, each of the plurality of items may have categorical metadata assigned thereto. In another example, less than each of the plurality of items may have categorical metadata assigned thereto. For instance, a system failure, lack of confidence with respect to at least one category, or other factor may cause at least one item to lack categorical metadata. In yet another example, an item that is not assigned categorical metadata may later be assigned categorical metadata of, for instance, "unknown." The lack of categorical metadata for some items does not impair ability to use the methodology 600.

At 608, the categorical metadata that has been assigned to the plurality of items is determined. At 610, categorical metadata is assigned to the query based at least in part upon the categorical metadata assigned to the plurality of items.

At 612, a value that indicates that a category corresponding to the categorical metadata assigned to the at least one item corresponds to a category that is included in the categorical metadata assigned to the at least one query is generated. At 614 the item is selectively positioned in a ranked list of search results based at least in part upon the value generated at 612. The methodology 600 completes at 616.

Figure 7:
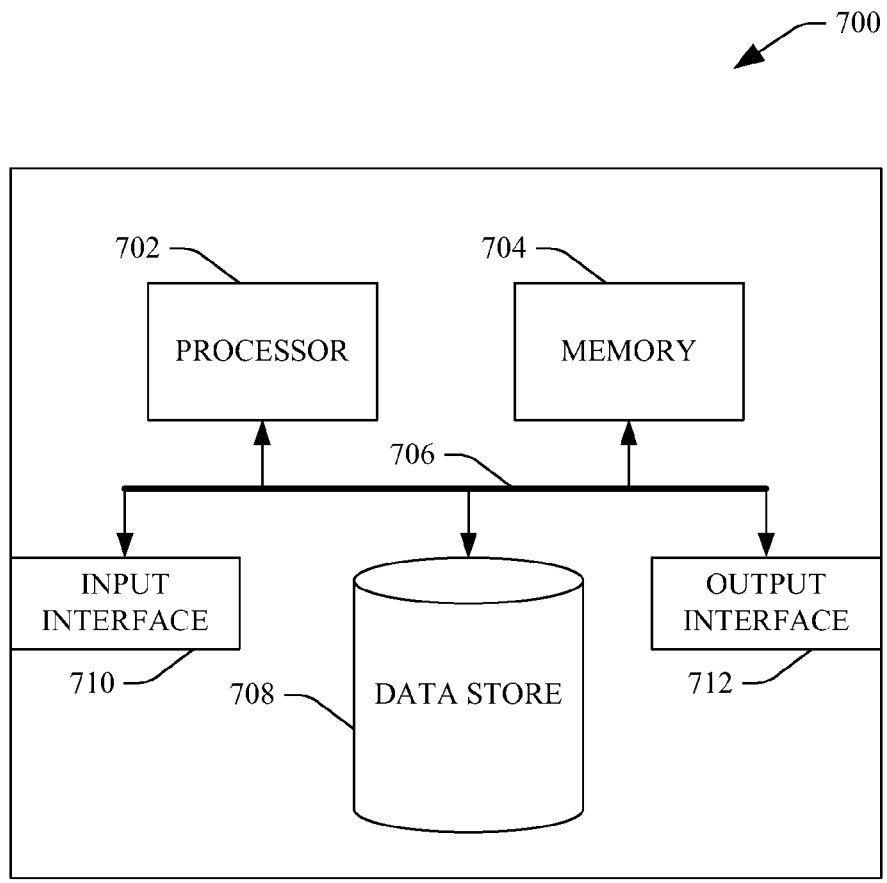
FIG. 7 is an example computing system.

Referring now to FIG. 7, a high-level illustration of an example computing device 700 that can be used in accordance with the systems and methodologies disclosed herein is illustrated. For instance, the computing device 700 may be used in a system that supports ranking search results, based at least in part upon categorical metadata pertaining to at least one item or at least one query, is illustrated. In another example, at least a portion of the computing device 700 may be used in a system that supports determining categorical metadata pertaining to a query. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store categorical metadata pertaining to a query, categorical metadata pertaining to one or more items, features based at least in part upon the aforementioned categorical metadata, etc.

The computing device 700 additionally includes a data store 708 that is accessible by the processor 702 by way of the system bus 706. The data store 708 may include executable instructions, categorical metadata pertaining to queries or documents, features derived from the categorical metadata, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a search engine for ranking items responsive to receipt of a query, the method comprising:
    at the search engine, responsive to receiving the query that is to be executed over a plurality of items in a data repository, identifying a document-query feature that pertains to a combination of the query and an item in the plurality of items, wherein the document-query feature is based upon:
        a document category that has been previously assigned to the item; and
        a query category that has been previously assigned to the query, wherein the query category is dependent upon document categories assigned to items previously retrieved by the search engine when executing the query over a data repository, the document-query feature is indicative of a correlation between the document category and the query category;
    at the search engine, retrieving items from the data repository based upon the query;
    ranking the items based upon document-query features assigned to the items; and
    responsive to ranking the items, outputting a ranked list of items, the item positioned in the ranked list of items based upon the document-query feature.

2. The method of claim 1, further comprising assigning the query category to the query, wherein assigning the query category to the query comprises:
    identifying document categories that are assigned, respectively, to the previously retrieved items; and
    assigning the query category to the query based upon the document categories that are assigned, respectively, to the previously retrieved items.

3. The method of claim 1, further comprising assigning the query category to the query, wherein assigning the query category to the query comprises:
    identifying document categories assigned, respectively, to a top threshold number of items in the previously retrieved items; and
    assigning the query category to the query based upon the document categories that are assigned, respectively, to the top threshold number of items in the previously retrieved items.

4. The method of claim 1, further comprising assigning the query category to the query, wherein assigning the query category to the query comprises:
    accessing a click graph, the click graph comprises a first set of nodes and a second set of nodes, edges couple nodes in the first set of nodes with nodes in the second set of nodes, nodes in the first set of nodes are representative of queries, nodes in the second set of nodes represent items, and an edge between a node in the first set of nodes and a node in the second set of nodes indicates that a user has clicked on an item represented by the node in the second set of nodes upon issuing a query represented by the node in the first set of nodes to the search engine;
    analyzing the click graph to determine items that were previously clicked by users that issued the query to the search engine when the query was issued to the search engine by the users;
    determining document categories assigned, respectively, to the items that were clicked on by the users when the query was issued; and
    assigning the query category to the query based upon the document category being assigned to at least one item in the items that were clicked on by the users when the query was issued.

5. The method of claim 4, wherein assigning the query category to the query additionally comprises:
    locating additional items by executing a random walk over the click graph;
    determining document categories assigned, respectively, to the additional items located via the random walk; and
    assigning the query category to the query based part upon the additional items located via the random walk being assigned the document category.

6. The method of claim 1, the plurality of items comprise a second item that is assigned a plurality of document categories, a document-query feature that pertains to a combination of the second item and the query is based upon a score assigned to at least one category in the plurality of document categories.

7. The method of claim 1, the ranked list of items comprise a plurality of items, wherein each item in the ranked list of items has at least one document category respectively assigned thereto, and document-query features pertaining to items in the ranked list of items based upon probabilities of the document category being assigned to items in the ranked list of items.

8. The method of claim 1, the document-query feature is based upon a posterior entropy of the item.

9. The method of claim 1, the document-query feature is based upon a binary value indicating a probability of the query category assigned to the query being correct.

10. The method of claim 1, the query has a plurality of query categories assigned thereto, and wherein the document-query feature is based upon an entropy value pertaining to a distribution of the query categories.

11. The method of claim 1, the document-query feature indicates whether the document category assigned to the item is equivalent to the query category assigned to the query.

12. A system that facilitates ranking items returned by a search engine in response to receipt of a query, the system comprising:

a processor; and a memory that comprises a plurality of components that are executed by the processor, the plurality of components comprising:

a receiver component that receives a document category previously assigned to a first item and a query category previously assigned to the query;

a computation component that computes a document-query feature for a combination of the first item and the query, the document-query feature computed based upon the document category and the query category, the document-query feature indicative of whether the document category matches the query category, the query category previously assigned to the query based upon document categories assigned to items previously retrieved by the search engine based upon the query; and a ranker component that receives the items returned by the search engine and outputs a ranked list of items based upon the query, a position of the first item in the ranked list of items based upon the document-query feature.

13. The system of claim 12, the plurality of components further comprising a query metadata determiner component that assigns the query category to the query based upon the document category being assigned to an item in the items previously retrieved by the search engine based upon the query.

14. The system of claim 13, wherein the query metadata determiner component assigns a plurality of query categories to the query based upon document categories assigned to the items retrieved by the search engine.

15. A computer-readable data storage device comprising instructions that, when executed by a processor, cause the processor to perform acts comprising:

receiving a query;

retrieving items responsive to receipt of the query, wherein the items have respective document-query features assigned thereto, each document-query feature indicative of whether a query category assigned to the query and document categories respectively assigned to the items match;

ranking the items responsive to retrieving the items to generate a ranked list of items, wherein a position of an item in the ranked list of items is based upon a document-query feature assigned to a combination of the query and the item; and returning the ranked list of items to an issuer of the query.

16. The system of claim 12, the ranked list of items comprises a second item that is assigned a second document category, a second document-query feature for the second item is based upon a score assigned to the second category that is assigned to the second item, the ranker component ranks the item relative to the second item as a function of a value of the document-query feature relative to the score.

17. The system of claim 12, a second item in the ranked list of items has a second document category assigned thereto, and wherein the query has a second query category assigned thereto that is based upon the second item having the second document item assigned thereto.

18. The computer-readable storage device of claim 15, the query assigned multiple query categories, and wherein ranking the items comprises ranking the items based upon the multiple categories assigned to the queries.

19. The computer-readable storage device of claim 15, the item has multiple document categories assigned thereto, and the position of the item in the ranked list of items is based upon the multiple document categories assigned to the item.

20. The computer-readable storage device of claim 15, the document-query feature is a value that is indicative of a confidence that the query category and the document category match.

* * * * *